United States Patent Office 2,921,056
Patented Jan. 12, 1960

2,921,056

POLYMERIZATION OF OLEFINS

Archibald P. Stuart, Yeadon, Pa., assignor to Sun Oil Company, Philadelphia, Pa., a corporation of New Jersey No Drawing. Application July 12, 1956
Serial No. 597,335

8 Claims. (Cl. 260—93.7)

This invention relates to the preparation of polymers of normally gaseous olefins and specifically relates to the preparation of solid polymers of ethylene and propylene.

An object of the present invention is to provide a low temperature, low pressure process for the preparation of solid polymers of normally gaseous olefins. A specific object of the invention is to provide a process for the preparation of solid polymers of ethylene. Another specific object is to provide a process for the preparation of solid polymers of propylene. A further specific object is to provide a process for the preparation of solid copolymers of ethylene and propylene.

It has now been found that normally gaseous olefins are rapidly polymerized to solid polymers by introducing such an olefin, under polymerizing conditions, into a reaction mixture prepared by admixing, in a substantially inert, liquid organic reaction medium, a polymerization initiator containing a metal capable of existing in a plurality of valence states such as a metal halide, metal carbonyl or metal chelate, with a reducing agent, and subsequently adding aluminum cyanide, as hereinafter described. The resulting admixture forms a catalytically active reaction medium which is effective for converting normally gaseous olefins to solid polymers.

Ethylene, propylene and mixtures of ethylene and propylene are the feed stocks in the present process. Accordingly, the products of the invention are polymers of ethylene, polymers of propylene, or copolymers of ethylene and propylene. The normally gaseous olefin, or a mixture of such olefins, can be from any source such as from refinery streams, the dehydration of alcohol, the dehydrogenation of paraffins, and the like. The presence of a small amount of saturated hydrocarbons, such as ethane, propane and butane, is not deleterious. Also, other olefins such as butenes, butadiene, pentenes and styrene can be present in an amount up to about 25% by weight of the normally gaseous olefin employed and good results obtained. Such other olefins appear to form copolymers with the polymer of the normally gaseous olefin and such copolymers form useful products as hereinafter described.

In a specific embodiment of the invention titanium tetrachloride is dissolved in isooctane. An inert atmosphere is provided and liquid sodium amalgam added with stirring. Aluminum cyanide is then added also with stirring. The resulting admixture contains a solid catalyst phase of finely divided particles and forms the reaction mixture of the invention in which olefins are polymerized. An olefin such as ethylene, in liquid or gaseous phase, is passed into the reaction mixture and is therein polymerized to relatively high molecular weight solid polymers. In place of titanium tetrachloride other metal halides, metal carbonyls or metal chelate compounds, as hereinafter explained, can be used and for convenience such metal compounds are herein designated as "polymerization initiators," and in place of sodium amalgam other reducing agents can be used, also as hereinafter explained.

Aluminum cyanide for use in the process is conveniently prepared by reaction between aluminum hydride and hydrogen cyanide. Preparation by this method is described in Z. Naturforsch 6B, p. 226 (1951). The aluminum cyanide product is stable in the absence of oxygen and moisture, which materials are excluded from the present process.

Polymerization initiators which can be used include compounds containing a metal capable of existing in at least two valence states, such as metal carbonyls, metal halides and metal chelate compounds. Metal carbonyls which can be employed have the general formula, $M_x(CO)_y$, in which M represents a metal and $x$ and $y$ are whole numbers. Carbonyls of metals of groups VI, VII and VIII of the periodic table, and specifically carbonyls of iron, cobalt, nickel, ruthenium, rhodium, osmium, rhenium, chromium, molybdenum, and tungsten can be used. Some of these metals form several carbonyl compounds and any such compound can be used so long as the metal thereof is not in its lowest valence state. It is preferred to use a carbonyl of cobalt, and specifically cobalt tetracarbonyl. Iron pentacarbonyl and nickel tetracarbonyl are also preferred metal carbonyls to use in the process of the invention.

Metal halides which can be used include the halides of the metals of groups IV, V, VI and VIII of the periodic table, and of the rare earth metals. The metal of the halide must not be in its lowest valence state. Titanium tetrachloride is a preferred metal halide. Zirconium tetrachloride, chromium dichloride, chromium trichloride, vanadium pentachloride, tungsten hexachloride and uranium tetrachloride are also preferred and give good results, as do the bromide and fluoride analogues thereof. Chelate compounds which can be used are metal beta-ketones formed between metals of groups IV, V, VI, VII and VIII of the periodic table and a beta-ketone which has the structure:

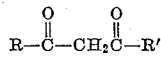

wherein R is an alkyl, cycloalkyl, aryl or aromatic radical, or a substituted derivative thereof, and wherein R' is hydrogen or an alkyl, cycloalkyl, aryl or aromatic radical, or a substituted derivative thereof. When R' is a hydrocarbon radical, it may be the same as, or different from, R. R may, for example, be a methyl, ethyl, propyl, isopropyl, butyl, cyclohexyl, methylcyclohexyl, phenyl, or tolyl radical, and R' may be the same as R or a different radical such as described for R. Chromium acetylacetonate, zirconium acetylacetonate, vanadium acetylacetonate and thorium acetylacetonate are preferred metal chelates to use in the process, and the corresponding chelates of 1,3-hexanedione and of 3,5-nonanedione also give good results. All of such chelates contain a metal capable of being reduced.

Organic solvents which are liquid and substantially inert under the reaction conditions employed are used as the reaction medium. Saturated hydrocarbons such as the pentanes, hexanes, octanes, decanes, and cycloparaffins such as methylcyclopentane, alkyl substituted cyclopentanes, cyclohexane, alkyl substituted cyclohexanes, decalin, and mixtures thereof are preferred materials for use as the organic reaction medium. Aromatic hydrocarbons such as benzene, toluene, xylene, the trimethylbenzenes, mixtures thereof and the like, chlorinated hydrocarbons such as carbon tetrachloride and ethers such as ethyl ether can be used in some instances with good results.

Preferred reducing agents to employ are the alkali metals, mixtures thereof, and their amalgams with mercury. Sodium is the preferred alkali metal to use but potassium, rubidium, cesium, or mixtures or amalgams thereof give good results. It is preferred to prepare the reaction mixture of the process under conditions such that the reducing agent is in the fluid state when contacted with the polymerization activator.

The quantity of reducing agent should be sufficient to reduce the metal of the polymerization initiator to a lower valence state. Not more than 3 moles of reducing agent for each mole of polymerization initiator should be employed. Preferably the quantity of reducing agent is substantially the stoichiometrical quantity required to convert the metal of the polymerization initiator to the desired valence state. The mole ratio of aluminum cyanide to polymerization initiator is preferably within the range of from 1 to 5, but can be varied from 0.1 to 10 and good results obtained therewith. The quantity of substantially inert, liquid organic reaction medium to employ does not appear critical and can be varied over a wide range with good results. A quantity sufficient to obtain a dispersion of the solid catalyst phase must be used, and such quantity is generally from 5 to 1,000 parts by weight or more, based on the quantity of polymerization initiator used. The organic reaction medium should be substantially free from moisture and air, and moisture and air are excluded from the reaction mixture during the preparation thereof and during olefin polymerization.

The liquid reaction medium of the invention can be prepared by admixing the several components in any order except that the aluminum cyanide should not be contacted with the reducing agent in the absence of the polymerization initiator. It is preferred to introduce the polymerization initiator into the liquid organic reaction medium containing a reducing agent, and then introduce the aluminum cyanide therein. On so-combining the reducing agent and polymerization initiator, a finely divided solid phase is formed as a slurry in the organic reaction mixture. The aluminum cyanide can be added to this slurry to form the reaction mixture of the process, or the solid particles of the slurry can be separated and redispersed in an additional organic reaction medium, and aluminum cyanide added thereto to form the reaction mixture of the invention.

The olefins can be introduced into the reaction mixture in liquid or gas phase, or dissolved in a solvent therefor, in which case the solvent can be the organic reaction medium of the reaction mixture, or a different such material as described for the inert, liquid organic solvent of the reaction medium. The pressure can be from subatmospheric to 1,000 atmospheres or more, but it is preferred to employ a pressure of from 1 atmosphere to about 55 atmospheres since the olefins are substantially soluble in the reaction mixture under these pressure conditions and since a pressure above about 55 atmospheres does not appear to enhance the rate of reaction or the properties of the polymer product. The temperature of the reaction mixture during the polymerization step is preferably from about 0° C. to 250° C. since good results are obtained in this temperature range. Such reaction conditions are herein conveniently designated as "polymerization conditions." The process should be performed to exclude moisture and air, as above described.

After completion of the polymerization reaction, as indicated by lack of ethylene consumption by the reaction mixture, the reaction mixture containing the polymer is treated to deactivate and at least partially remove catalyst therefrom. This can be accomplished by washing with an alcoholic solution of hydrogen chloride, and then with an alcohol such as methanol. If necessary or desirable, washing can be accomplished by means which also comminute the polymer. The alcohol is removed such as by evaporation to obtain the polymer products of the invention. Other means of catalyst deactivation and removal can be used if desired, such as by washing with a mineral acid followed by washing with water and drying.

The following specific embodiment illustrates an embodiment of the process in which "parts" refers to parts by weight unless otherwise indicated.

To 400 parts of n-octane is added 0.4 part of solid metallic sodium. The mixture is heated to about 100° C. and with vigorous stirring 1.9 parts of titanium tetrachloride added. The mole ratio of sodium to titanium tetrachloride is about 1.7. A quantity of aluminum cyanide incorporated in 10 parts of n-octane is then added with continuous vigorous stirring so that the mole ratio of aluminum cyanide to titanium tetrachloride is 1. With the reaction mixture maintained at about 100° C. ethylene is introduced, by bubbling into the reaction mixture, at the rate of about 20 parts per hour, continuous stirring being maintained. The pressure during the addition was maintained at substantially atmospheric pressure during the addition of ethylene. After about 4 hours the rate of ethylene adsorption into the reaction mixture decreases appreciably. The reaction is then stopped and about 200 parts of methanol containing hydrogen chloride added still with continuous stirring. The polymer is then filtered and washed with methanol. On drying to remove methanol there is recovered a polymer product of white finely divided polymers of ethylene.

When other substantially inert liquid reaction media, other reducing agents and/or other polymerization activators are employed within the limits above described, substantially equivalent results are obtained.

The polymer products of the invention vary from waxy solids having molecular weights of from about 300 to 800 to hard, resinous solids having molecular weights of above about 100,000. Such polymer products are useful for the preparation of articles of manufacture such as thin flexible sheets for wrapping food products, containers for corrosive liquids, pipes for conducting liquids, and the like. Such articles are advantageously prepared by extrusion, or molding processes or by other fabrication means.

The invention claimed is:

1. A process for polymerizing normally gaseous olefins which comprises admixing aluminum cyanide and an alkali metal reducing agent in the presence of a polymerization initiator selected from the group consisting of the halides of groups IV, V, and VI metals, in an inert liquid organic reaction medium, the mole ratio of aluminum cyanide to polymerization initiator being in the range of from 0.1 to 10 and the mole ratio of the alkali metal to the polymerization initiator being not more than 3, and introducing a normally gaseous olefin into the resulting admixture under polymerizing conditions including a pressure of from 1 atmosphere to 55 atmospheres and a temperature of from 0° C. to 250° C.

2. A process as defined by claim 1 wherein the olefin is propylene.

3. A process as defined by claim 1 wherein the olefin is ethylene.

4. A process as defined by claim 1 wherein the polymerization initiator is a group IV metal halide.

5. A process as defined by claim 1 wherein the polymerization initiator is a titanium halide.

6. A process as defined by claim 1 wherein the polymerization initiator is titanium tetrachloride.

7. A process for polymerizing ethylene which comprises admixing an alkali metal reducing agent and aluminum cyanide in the presence of titanium tetrachloride in an inert liquid saturated hydrocarbon reaction medium, the mole ratio of aluminum cyanide to titanium tetrachloride being in the range of from 0.1 to 10 and the mole ratio of the alkali metal to titanium tetrachloride being not more than 3, and introducing ethylene into the resulting admixture under polymerizing conditions including a pressure of from 1 to 55 atmospheres and a temperature of from 0° C. to 250° C.

8. A process for polymerizing propylene which comprises admixing an alkali metal reducing agent and aluminum cyanide in the presence of titanium tetrachloride in an inert liquid saturated hydrocarbon reaction medium, the mole ratio of aluminum cyanide to titanium tetrachloride being in the range of from 0.1 to 10 and the mole ratio of the alkali metal to titanium tetrachloride being not more than 3, and introducing propylene into the resulting admixture under polymerizing conditions including a pressure of from 1 to 55 atmospheres and a temperature of from 0° C. to 250° C.

References Cited in the file of this patent

FOREIGN PATENTS 538,782  Belgium _____ Dec. 6, 1955